United States Patent
Hoffman et al.

(10) Patent No.: US 7,198,062 B2
(45) Date of Patent: Apr. 3, 2007

(54) FLUID CONTROL VALVE

(75) Inventors: Herbert L. Hoffman, Seattle, WA (US); Pat D. Parkin, Bonney Lake, WA (US); Frederick R. Helms, Puyallup, WA (US); Wen-Hwang Lin, Moorpark, CA (US); Roy Hai-Tien Loh, Thousand Oaks, CA (US); Yeu-Chuan Hsia, Northridge, CA (US); Naval K. Agarwal, Sammamish, WA (US); F. Wayne Hollatz, Elma, WA (US); Robert J. Devitis, Baytown, TX (US); Richard A. Black, Lynnwood, WA (US); Wendell R. Miller, Bellevue, WA (US); Martin Steinert, Seligenstadt (DE); Frank Arnold, Berlin (DE); Ulf Michel, Berlin (DE); Wolfgang Neise, Berlin (DE)

(73) Assignee: The Boeing Company, Chicago, IL (US)

( * ) Notice: Subject to any disclaimer, the term of this patent is extended or adjusted under 35 U.S.C. 154(b) by 265 days.

(21) Appl. No.: 10/831,673

(22) Filed: Apr. 23, 2004

(65) Prior Publication Data

US 2004/0238046 A1    Dec. 2, 2004

Related U.S. Application Data

(63) Continuation-in-part of application No. 10/651,152, filed on Aug. 28, 2003, now abandoned, which is a continuation-in-part of application No. 10/301,378, filed on Nov. 21, 2002, now Pat. No. 6,682,413.

(51) Int. Cl.
*B64C 1/14* (2006.01)
*E03B 1/00* (2006.01)

(52) U.S. Cl. ............... 137/601.09; 244/129.4; 454/71; 454/76; 137/601.14

(58) Field of Classification Search ........... 137/601.05, 137/601.08; 251/212, 120, 356; 454/156, 454/71, 75
See application file for complete search history.

(56) References Cited

U.S. PATENT DOCUMENTS 1,872,599 A * 8/1932 Le Grand .............. 137/601.08

(Continued)

*Primary Examiner*—Eric Keasel
*Assistant Examiner*—Cloud Lee
(74) *Attorney, Agent, or Firm*—Harness, Dickey & Pierce, P.L.C.

(57) ABSTRACT

A valve is provided for controlling a flow of a fluid between a first environment and a second environment. The valve includes a frame adapted to fit within a perimeter of an aperture in a divider separating the first environment from the second environment. The valve additionally includes a first gate movable within the frame to control a flow of the fluid through the aperture between the first environment and the second environment. The first gate includes a substantially aerodynamically clean surface substantially free from protrusions disrupting the flow of the fluid over the first gate surface. Additionally, the first gate includes a trailing edge having a baffle adapted to cover an aft edge of the frame when the first gate is positioned to have a small opening angle. The baffle includes a plurality of 3-D notches in a front side of the baffle. The valve further includes a second gate movable within the frame to control a flow of the fluid through the aperture between the first environment and the second environment. The second gate also includes a substantially aerodynamically clean surface substantially free from protrusions disrupting the flow of the fluid over the second gate surface. Additionally, the second gate includes a trailing edge comprising a plurality of 3-D notches in a front side of the trailing edge.

26 Claims, 12 Drawing Sheets

U.S. PATENT DOCUMENTS

| | | | |
|---|---|---|---|
| 3,228,318 A | * | 1/1966 | Wheatley ............... 137/601.08 |
| 3,281,113 A | * | 10/1966 | Ahern .................. 137/601.08 |
| 3,525,327 A | * | 8/1970 | Crudden ............... 137/601.08 |
| 3,779,338 A | * | 12/1973 | Hayden et al. ............ 181/296 |
| 4,089,618 A | * | 5/1978 | Patel .......................... 416/228 |
| 5,074,376 A | * | 12/1991 | Powell ....................... 181/277 |
| 6,116,541 A | * | 9/2000 | Chuang et al. ........... 244/129.4 |
| 2002/0000307 A1 | * | 1/2002 | Denk et al. ................ 454/156 |

* cited by examiner

FLUID CONTROL VALVE

CROSS REFERENCE TO RELATED APPLICATIONS

This application is a Continuation-In-Part of U.S. patent application Ser. No. 10/651,152 filed on Aug, 28, 2003 now abandoned, which is a Continuation-In-Part of U.S. patent application Ser. No. 10/301,378 filed on Nov. 21, 2002 now U.S. Pat. No. 6,682,413. The disclosures of the above applications are incorporated herein by reference.

FIELD OF INVENTION

The invention relates generally to valves for controlling the flow of a fluid between a first environment and a second environment, and more particularly to reducing noise generated by the fluid flowing through such a valve.

BACKGROUND OF THE INVENTION

Gated valves are often used to control the flow of a fluid from one environment to another. For example, gated valves may control the flow of a fluid, such as air, from one portion of an enclosure, such as a pipe, to another portion of the enclosure or from an inside or outside area of an enclosure, such as a mobile platform, to the respective outside or inside area of the enclosure. Typically, as the rate of flow through the valve increases, the amount of audible noise, produced by the fluid passing through the valve and over the valve gate(s), increases. For example, if a valve is controlling the flow of air, the faster the air flows through the valve and over the valve gate(s), the greater the likelihood there is of audible tones (i.e. noise) being generated by coherent vortex shedding as the air separates from the gate(s) surface. Vortex shedding occurs when a fluid passing over a surface separates from the surface due to some incongruity; e.g. a bump or protrusion on the surface. As the fluid separates from the surface the fluid begins to tumble. If this tumbling occurs at a constant rate, i.e. frequency, coherent vortex shedding occurs and tones are produced.

A more specific example would be the use of gated valves in mobile platforms. Mobile platforms, such as aircraft, buses, ships or trains, often control such things as passenger compartment air pressure, air condition/quality and air circulation by controlling the flow of air from inside the passenger compartment to the environment outside the passenger compartment utilizing a gated valve. At various flow rates, the air passing through the valve and over the gate(s) will generate tones caused by the air passing through the valve opening and over or across the surfaces of the gate.

The noise generated by a fluid as the fluid passes through a gated valve can be nuisance to people within hearing distance and become very irritating over extended periods of time.

BRIEF SUMMARY OF THE INVENTION

In one preferred embodiment, a valve is provided for controlling a flow of a fluid between a first environment and a second environment. The valve includes a frame adapted to fit within a perimeter of an aperture in a divider separating the first environment from the second environment. The valve additionally includes a first gate movable within the frame to control a flow of the fluid through the aperture between the first environment and the second environment. The first gate includes a substantially aerodynamically clean surface substantially free from protrusions disrupting the flow of the fluid over the first gate surface. Additionally, the first gate includes a trailing edge having a baffle adapted to cover an aft edge of the frame when the first gate is positioned to have a small opening angle. The baffle includes a plurality of 3-D notches in a front side of the baffle. The valve further includes a second gate movable within the frame to control a flow of the fluid through the aperture between the first environment and the second environment. The second gate also includes a substantially aerodynamically clean surface substantially free from protrusions disrupting the flow of the fluid over the second gate surface. Additionally, the second gate includes a trailing edge comprising a plurality of 3-D notches in a front side of the trailing edge.

In another preferred embodiment, a method is provided for controlling the flow of a fluid from the first environment to the second environment. The method includes providing a valve to be installed in a divider separating the first environment and the second environment. The valve includes a frame, a first gate movable within the frame and a second gate movable within the frame. The first and second gates are adapted to control the flow of fluid from the first environment to the second environment. The method additionally includes reducing vortex shedding by providing each of the first gate and the second gate with a substantially aerodynamically clean surface substantially free from protrusions that disrupt the flow of fluid over a surface of the first gate surface. The method additionally includes reducing edge tones as the fluid flows through the valve by providing a baffle included in a trailing edge of the first gate adapted to cover an aft edge of the frame when the first gate is positioned to have a small opening angle. The method further includes reducing vortex shedding by providing a plurality of 3-D notches in a front side of the baffle and by providing a plurality of 3-D notches in a front side of a trailing edge of the second gate.

In yet another preferred embodiment, a mobile platform is provided. The mobile platform includes a body including an outer shell having an aperture therethrough and a valve adapted to fit within the aperture for controlling the flow of air between an environment inside the mobile platform and an environment outside of the mobile platform. The valve includes a first gate movable and a second gate for controlling a flow of the fluid through the aperture between the first environment and the second environment. Each of the first and second gates include a substantially aerodynamically clean surface substantially free from protrusions disrupting the flow of the fluid over the first and second gates. The first gate additionally includes a trailing edge having a baffle adapted to cover an aft edge of the frame when the first gate is positioned to have a small opening angle. A front side of the baffle includes a plurality of 3-D notches. Each of the notches in the front side of the baffle include a tapered run-out that begins at a vertex of the notch and obliquely runs out to the trailing edge of the baffle. The second gate includes a trailing edge having a front side with a plurality of 3-D notches. Each of the notches in the trailing edge of the second gate also include a tapered run-out that begins at a vertex of the notch and obliquely runs out to the trailing edge of the second gate.

The features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

The following description of the preferred embodiments is merely exemplary in nature and is in no way intended to limit the invention, its application or uses. Additionally, the advantages provided by the preferred embodiments, as described below, are exemplary in nature and not all preferred embodiments provide the same advantages or the same degree of advantages.

The present invention is applicable to any circumstance in which a valve is utilized to control the flow of a fluid between a first environment, or location, and a second environment, or location. For example, the invention is applicable to a mobile platform utilizing a valve to control the flow of air between a mobile platform interior environment and a mobile platform exterior environment. Although exemplary embodiments of the invention herein will reference a mobile platform, one skilled in the art will readily understand the scope of the invention should not be so limited.

Figure 1:
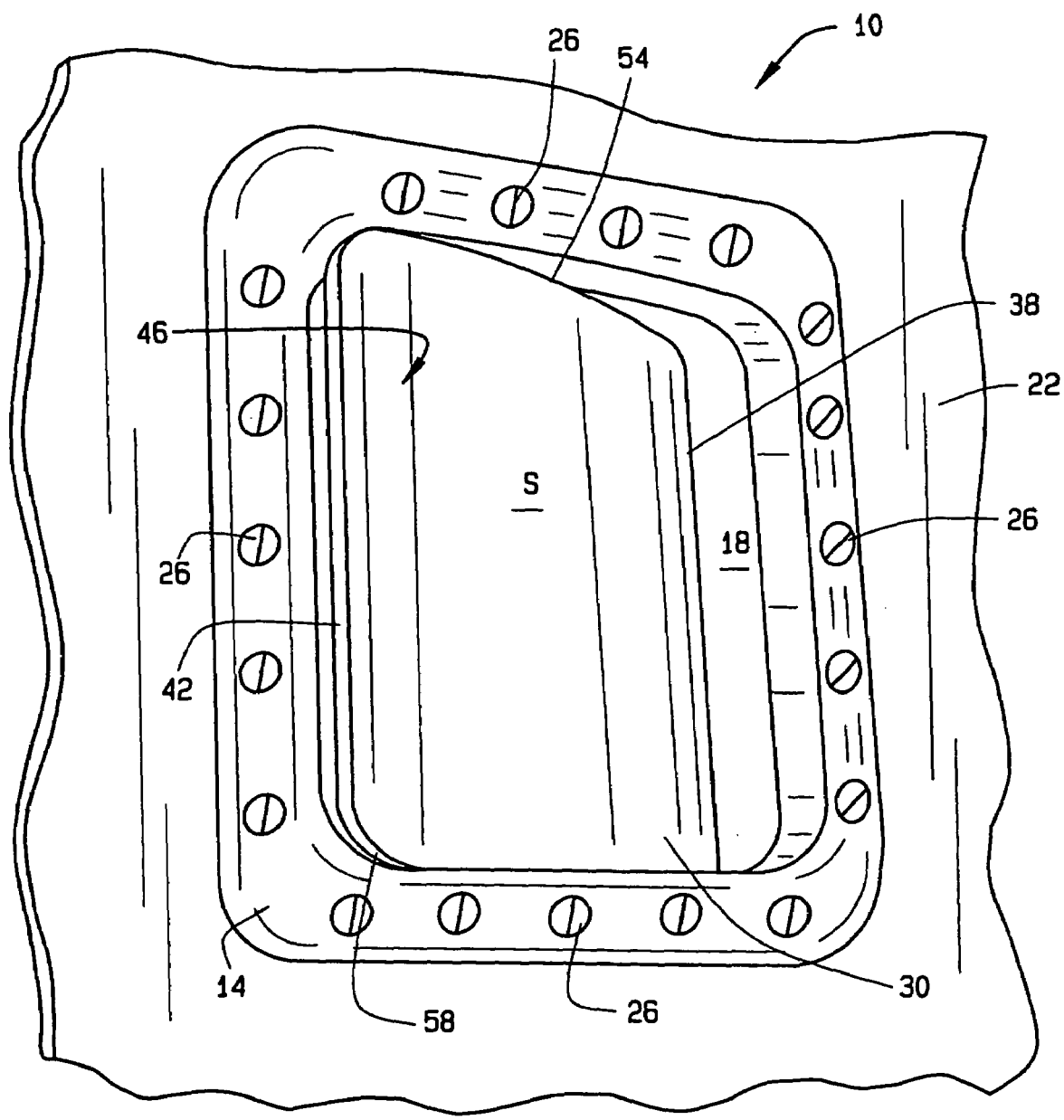
FIG. 1 is a schematic of a front view of a valve for controlling the flow of a fluid between a first environment and a second environment, in accordance with one preferred embodiment of the present invention.
Figure 2:
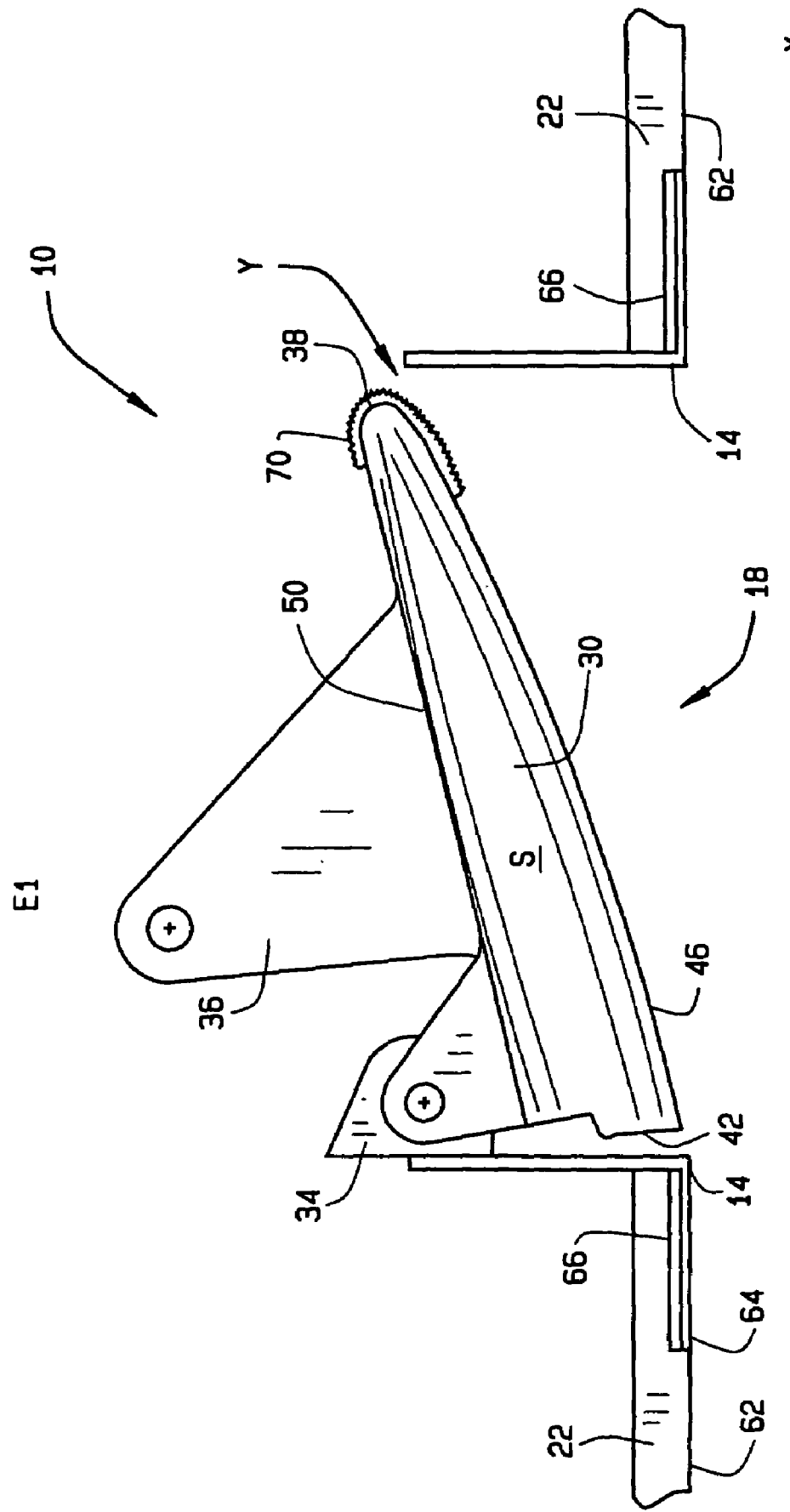
FIG. 2 is a schematic of a top view of the valve shown in FIG. 1.

FIGS. 1 and 2 are, respectively, a schematic of a front view and a top view of a valve 10 for controlling the flow of a fluid, for example air, between a first environment E1 and a second environment E2, in accordance with one preferred embodiment of the present invention. Valve 10 includes a frame 14 adapted to fit within a perimeter of an aperture 18 in a divider 22. Frame 14 is coupled to divider 22 using a fastening means 26 such as welding or a plurality of rivets, nuts and bolts, screws and tack welds. At least one gate 30 is hingedly coupled to frame 14, via at least one hinge 34, such that gate 30 is movable between an open position and a closed position within frame 14. In the closed position gate 30 will have approximately a zero degree (0°) angle with divider 22. In the open position gate 30 can have any angle greater than zero degrees (0°) and less than one hundred and eighty (180°) based on a desirable fluid mass flow through aperture 18. For example, the larger the desired mass flow through aperture 18, the larger the opening angle of gate 30 will be, while for smaller desired mass flows gate 30 will be open at smaller angles. The opening angle of gate 30 is also based on the size of valve 10. Valve 10 can be any size suitable for a specific application. For example, in applications where large fluid mass flows are desired, valve 10 will be larger than in applications where lesser fluid mass flows are desired.

A controller (not shown) coupled to an actuator 36 moves gate 30 within frame 14. Although in the various preferred embodiments described herein, valve 10 is described as controlling a flow of fluid in a direction Y, from E1 through valve 10 to E2, it should be understood that valve 10 controls the flow of fluid between environments E1 and E2 such that the direction of fluid flow can be in either direction. That is, valve 10 is capable of controlling the fluid flow from E1 through valve 10 to E2, or the fluid flow from E2 through valve 10 to E1.

Gate 30 includes a leading edge 38, a trailing edge 42, a front side 46, a back side 50, a top edge 54 and a bottom edge 58. Additionally, gate 30 includes a general surface generally indicated in FIGS. 1 and 2 by the reference character 'S'. Surface S cumulatively includes the surfaces of leading edge 38, trailing edge 42, front side 46, back side 50, top edge 54 and bottom edge 58. Gate 30 has a substantially aerodynamically clean profile, such that surface S is smooth and substantially free from protrusions that would impede, or disrupt, the flow of fluid over surface S of gate 30 and/or through valve 10. Therefore, fluid passing over gate 30, e.g. in the direction Y, is allowed to generally adhere to surface S as the fluid flows over gate 30, thereby reducing the occurrence of coherent vortex shedding, which creates audible noise, sometimes referred to herein as tones. Put another way, aerodynamically clean surface S enables laminar flow to occur as the fluid flows over surface S. Also, to reduce noise induced by the coherent vortex shedding, preferably substantially eliminate the noise, noise treatment is applied in critical areas of gate 30. The noise treatment is described in detail below.

In one embodiment, leading edge 38 is rounded, thereby contributing to the aerodynamically clean profile of gate 30 and reducing tones created by coherent vortex shedding. The rounded contour of leading edge 38 allows the fluid to pass around leading edge 38 with little or substantially no separation from surface S. Thus, the occurrence of coherent vortex shedding is greatly reduced, preferably substantially eliminated, whereby audible tones would be created. The rounded shape of leading edge 38 enhances the attachment of the fluid to leading edge 38 for approximately all angle openings of gate 30 and for approximately all fluid flow rates. The rounded leading edge 38 is particularly effective in reducing noise generation at small angle openings, e.g. 0° to 15°.

In another embodiment, front side 46 has a slightly convex contour, thereby contributing to the aerodynamically clean profile of gate 30 and reducing the occurrence of coherent vortex shedding.

Another source of noise that can commonly occur with valves, such as valve 10, is tones generated when a fluid flowing across a surface collides with a bump or an edge where the height of the surface changes. For example, edge tones can be created by a flow of fluid isolated to environment E2 that flows in a direction X along an outer surface 64 of frame 14, across aperture 18, along surface S, and collides with an aft edge of frame 14 on the opposite side of aperture 18. In one embodiment, to reduce the occurrence of such an edge tone, a trailing portion of front side 46, i.e. the portion of front side 46 that joins trailing edge 42, is adapted to have a substantially flush positional relationship with an outer surface 64 of frame 14. The trailing portion of front side 46 is adapted to have a substantially flush positional relationship with outer surface 64 for all angle openings of gate 30, particularly when gate 30 is positioned within a main operating range, e.g. between 10° and 20°. The flush positional relationship reduces a difference in surface heights between the trailing portion of front side 46 and frame outer surface 64. This greatly reduces edge tones that are produced as fluid flows in the direction X across aperture 18, over gate 30 and front side 46, and collides with frame 14.

Figure 3:
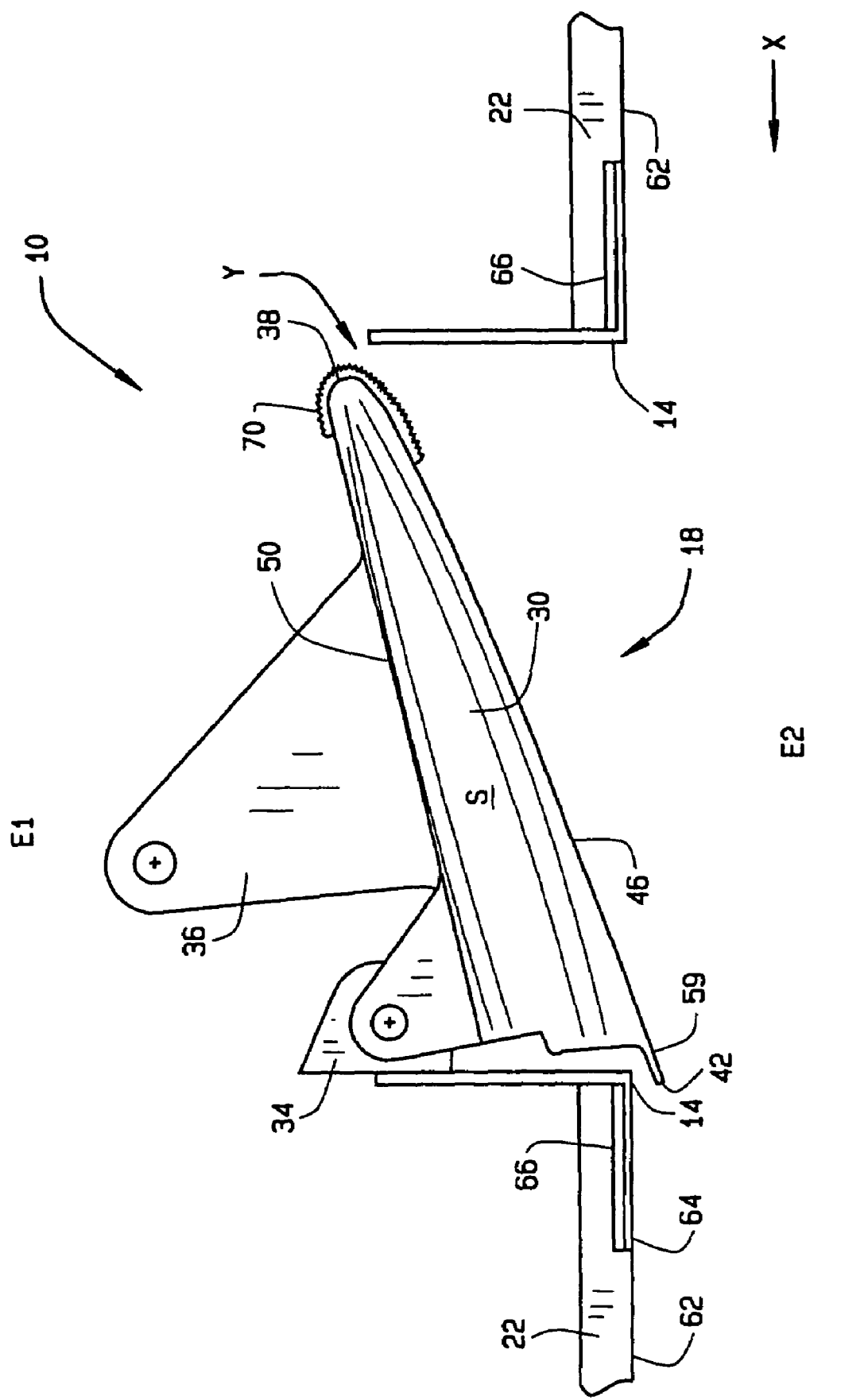
FIG. 3 is a schematic illustrating a preferred alternate embodiment of the valve shown in FIG. 2.

FIG. 3 illustrates an alternate preferred embodiment of valve 10, shown in FIG. 2. To reduce edge tones, trailing edge 42 includes a baffle 59 adapted to cover the aft edge of frame 14 when gate 30 is in an open position. The baffle 59 covers the aft edge of frame 14 particularly well when gate 30 is positioned to have a small opening angle, e.g. 0° to 25°. Baffle 59 prevents the fluid flowing along surface S, in the direction X, from colliding with the aft edge frame 14, thereby reducing edge tones.

Figure 4:
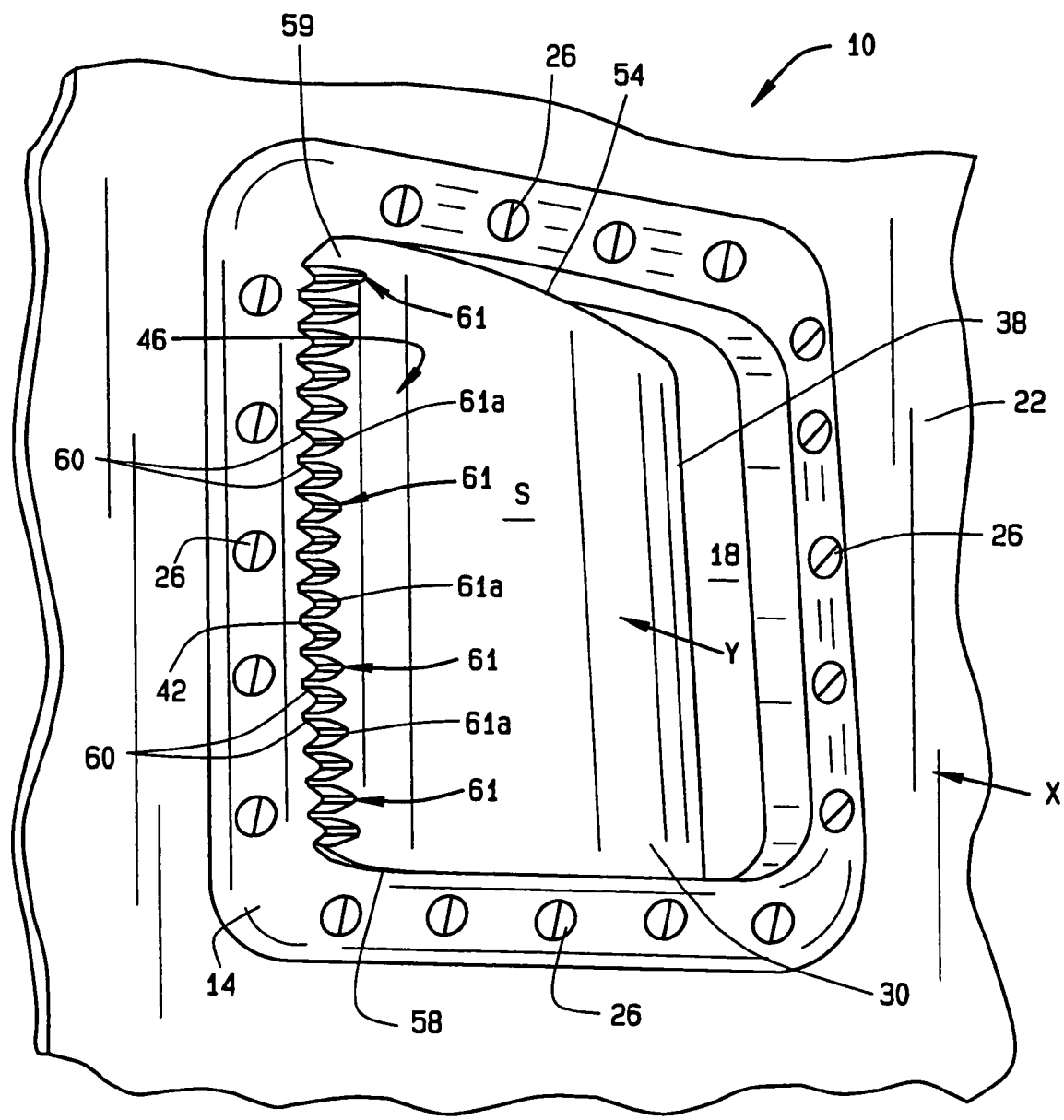
FIG. 4 is a schematic illustrating an alternate preferred embodiment of the valve shown in FIG. 3.

FIG. 4 illustrates another alternate preferred embodiment of valve 10, shown in FIG. 3. To further reduce edge tones, the trailing edge of baffle 59 has a 3-dimensional (3-D) non-uniform profile. More specifically, baffle 59 includes a plurality of 3-D notches 60. Notches 60 break up periodic flow structures that cause vortex shedding and substantially reduce the periodic formation of pressure variations that can also cause noise generation. The notches 60 cause fluid flowing in the direction Y along surface S to separate from surface S and begin to tumble such that the tumbling fluid will not establish a constant tumbling frequency. Furthermore, the notches 60 cause an intense mixing of the fluid flowing in the direction Y with the fluid flowing along the divider outer surface 62 in the direction X, thereby breaking up periodic flow separation of fluid structures. Generally, the notches 60 break up the periodic and symmetrical fluid flow through and across the valve 10, thereby preventing fluid resonances along the surface S of the valve 10.

In one preferred embodiment, the front side of each of the notches 60 has a generally U-shaped, tapered run-out 61 that begins at a vertex of the respective notch 60 and obliquely runs out to the trailing edge 42. Thus, surface S of front side 46 includes chamfered indentations, i.e. run-outs 61, that begin at the vertex of each notch 60 and terminate at trailing edge 42. Therefore, a 3-D scallop-like groove is formed in the surface S of front side 46 at each notch 60. In one preferred embodiment, each of the run-outs 61 have a middle portion 61a with lateral edges extending the length of the run-out 61. The run-outs 61 can have equal lengths, or various run-outs 61 can have differing lengths, depending on the desired design specification.

Although FIG. 4 illustrates notches 60 having a 3-D V-shape from the vertex to the trailing edge 42, notches 60 can have any shape suitable to reduce tones created as fluid passes over trailing edge 42. For example, from the vertex to the trailing edge 42, notches 60 can have a 3-D semi-circular-shape, a 3-D square-shape or a 3-D rectangular-shape. Similarly, a particular width and depth of each notch 60 can vary depending on the effectiveness of reducing edge tones for a particular application. The width and depth of each notch 60 that will provide the best reduction of edge tones can be determined by testing on valve 10. For example, computational fluid dynamics (CFD) testing can be performed to determine the desired width and depth of each notch 60.

Additionally, although notches 60 are shown in FIG. 4 to be spaced apart, such that trailing edge 42 includes linear portions between each consecutive notch 60, notches 60 can be continuous along trailing edge 42. The desired length of the linear edge, or lack thereof, between each notch 60 can also be determined through testing, such as CFD. In a preferred embodiment, the back side of the baffle 59 is substantially flat. Thus, the back side of each notch 60 is absent tapered run-outs. More specifically, the tapered shape of the run-out 61 in each notch 60 originates at the front side 46 of the first gate 30 and terminates approximately at or near the back side 50 of the first gate 30.

Referring again to FIGS. 1 and 2, yet another source of noise that can commonly occur with valves, such as valve 10, is leak tones generated when a fluid flows through a gap between parts of the valve. In one preferred embodiment, to substantially reduce, or eliminate, the risk of leak tones occurring by fluid flowing between divider 22 and frame 14, valve 10 includes a gasket 66 positioned between divider 22 and frame 14. Gasket 66 seals any openings that may exist between divider 22 and frame 14 due to variances in the contour of divider 22. Thus, by sealing any openings, gasket 66 substantially reduces, or eliminates, any leak noises from occurring between divider 22 and frame 14. Preferably, gasket 66 is designed to match the contour of frame 14, thereby enabling consistent seating of valve 10 in divider 22. The consistent seating of valve 10 in divider 22 reduces the potential for edge tones to occur as a flow of fluid isolated to E2 flows across divider outer surface 62.

In yet another embodiment, to further reduce, or eliminate, noise produced by coherent vortex shedding of the fluid, as the fluid passes over gate 30, at least one portion 70 of the gate 30 surface S includes a rough texture. More specifically, at least one section of surface S is adapted to include a rough texture portion, herein referred to as rough texture portion 70. The at least one section has a specific location on surface S determined to be a location where coherent vortex shedding occurs. Rough texture portion 70 effectively reduces, preferably substantially eliminates, noise generated by coherent vortex shedding for approximately all opening angles of gate 30 and fluid mass flow rates through aperture 18. For example, rough texture 70 will effectively reduce, or eliminate, coherent vortex shedding at small opening angles of gate 30 and high mass flow rates where coherent vortex shedding is particularly prone to occur in valves, such as valve 10.

Rough texture portion 70 can be provided by coupling or bonding a material or substance having a rough texture to surface S or by integrally forming the rough texture portion 70 with surface S either during or subsequent to the manufacturing of gate 30. For example, rough texture portion 70 can be anti-skid tape adhered to surface S or a gritty substance sprayed on surface S. In addition to having a specific location, rough texture portion 70 has a specific size, shape and roughness.

Rough texture portion 70 reduces, or eliminates, tones generated by coherent vortex shedding by breaking up the vortex shedding such that when the fluid separates from surface S and begins to tumble, the tumbling fluid will not establish a constant tumbling frequency. By breaking up the vortex shedding, the rough texture portion 70 randomizes any coherent vortex shedding, thereby substantially reducing the generation of noise and tones. Thus, rough texture portion 70 effectively detunes the tones by preventing the vortex shedding from establishing a constant frequency.

To determine the location of rough texture portion 70, testing must be performed on valve 10. For example CFD testing can be performed to determine at least one specific location on surface S where vortex shedding will occur. If such testing determines that vortex shedding will occur at more than one location on the gate surface S, then surface S will include a rough texture portion 70 at each location. Therefore, surface S can include a plurality of rough texture portions 70, whereby one rough texture portion 70 is located at each of the locations at which it has been determined vortex shedding will occur.

The size, shape and roughness of rough texture portion 70 that most effectively reduces, or eliminates, coherent vortex shedding at each specific location is also predetermined by testing, for example CFD testing. The size of rough texture portion 70 relates to the amount of surface area of surface S over which it has been determined that vortex shedding will occur. Likewise, the shape of rough texture portion 70 relates to the shape of surface area of surface S over which it has been determined that vortex shedding will occur.

In one preferred embodiment, the size(s) and shape(s) of the portion(s) of surface S over which testing has determined vortex shedding will occur are only used as minimum measurements to define the shape and size of rough texture portion 70. For example, it may be determined that vortex shedding will occur over a 2 cm$^2$ (0.310 in$^2$) area of surface S on front side 46 having a generally oval shape. Although only an oval area of 2 cm$^2$ has been determined to cause vortex shedding, for convenience and/or efficiency, surface S may include a rough texture portion 70 having a 3 cm$^2$ (0.465 in$^2$) generally rectangular area that covers and extends past the oval 2 cm$^2$ area. As a further example, although testing may determine that vortex shedding will occur over a small portion of surface S on the leading edge of gate 30, surface S may include rough texture portion 70 that covers the entire leading edge 38 and a portion of both front and back sides 46 and 50.

In an alternative preferred embodiment, the size(s) and shape(s) of the portion(s) of surface S over which testing has determined vortex shedding will occur, are used as substantially exact measurements that define the shape and size of rough texture portion 70. For example, if testing determines that vortex shedding will occur over a 2 cm$^2$ (0.310 in$^2$) area of surface S on front side 46 having a generally oval shape, front side 46 will include a rough texture portion 70 covering substantially 2 cm$^2$ (0.310 in$^2$) and having a generally oval shape. In another preferred embodiment, surface S includes rough texture portion 70 such that substantially all of surface S has a rough texture.

The quality of roughness of rough texture portion 70 is also predetermined from test results. That is, the rough texture portion 70 has a predetermined roughness such that the texture has a "graininess", "unevenness" and/or "coarseness" that will reduce coherent vortex shedding to a desirable level. Preferably, the predetermined roughness will substantially eliminate coherent vortex shedding. For example, laboratory wind tunnel testing or field testing of various qualities of roughness will determine the graininess of rough texture portion 70 to substantially reduce, or eliminate, coherent vortex shedding for a given gate 30 of valve 10.

In an exemplary embodiment, valve 10 can be an outflow valve for controlling air pressure within a mobile platform passenger cabin. In this exemplary embodiment, valve 10 would be installed in an aperture in an outer shell of a fuselage or body of the mobile platform and would control the flow of air, in the direction Y, from inside the mobile platform to an ambient environment outside the mobile platform.

Figure 5:
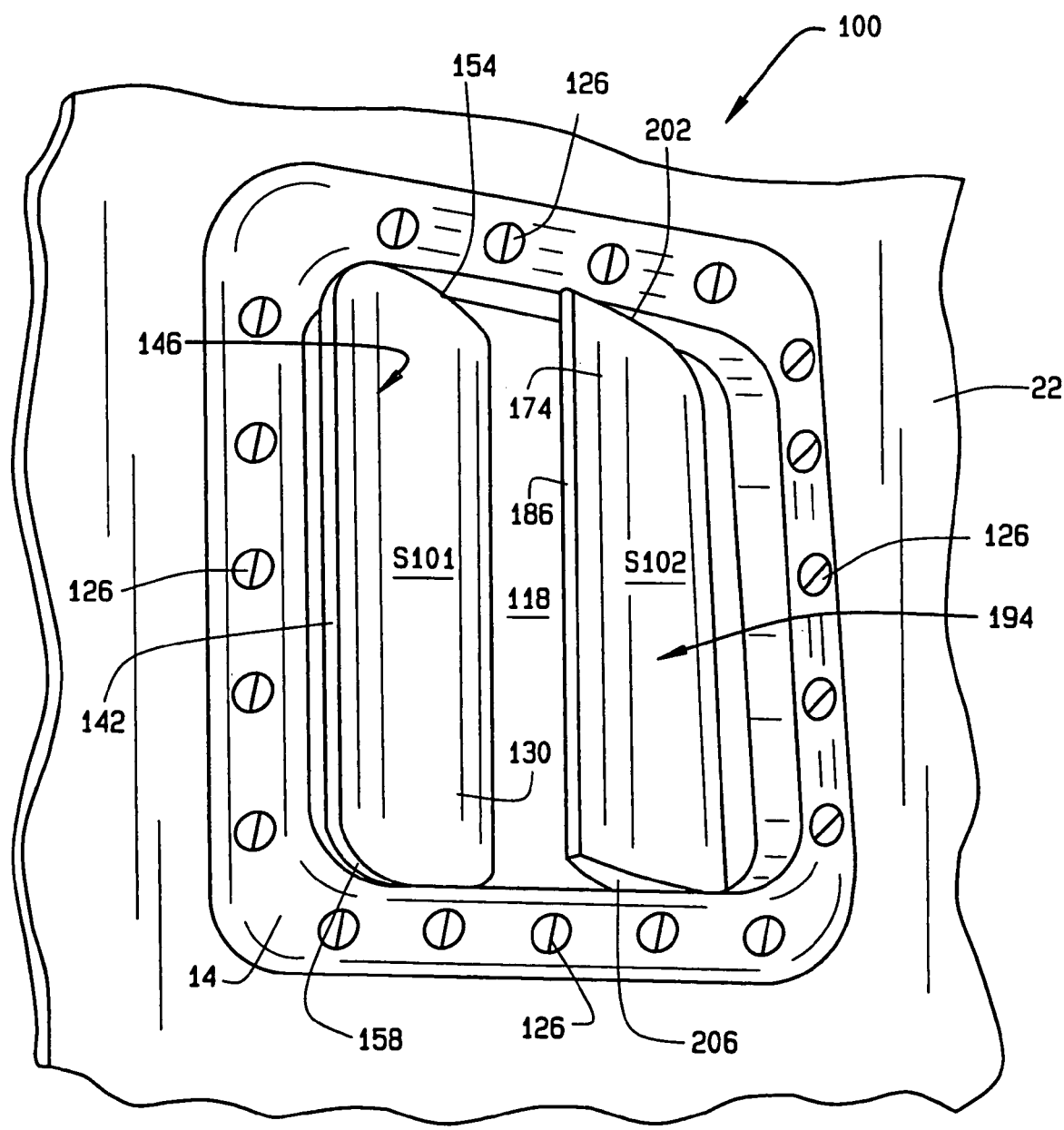
FIG. 5 is a schematic of a front view of a valve for controlling the flow of a fluid the between first and second environments shown in FIG. 2, in accordance with another preferred embodiment of the present invention.
Figure 6:
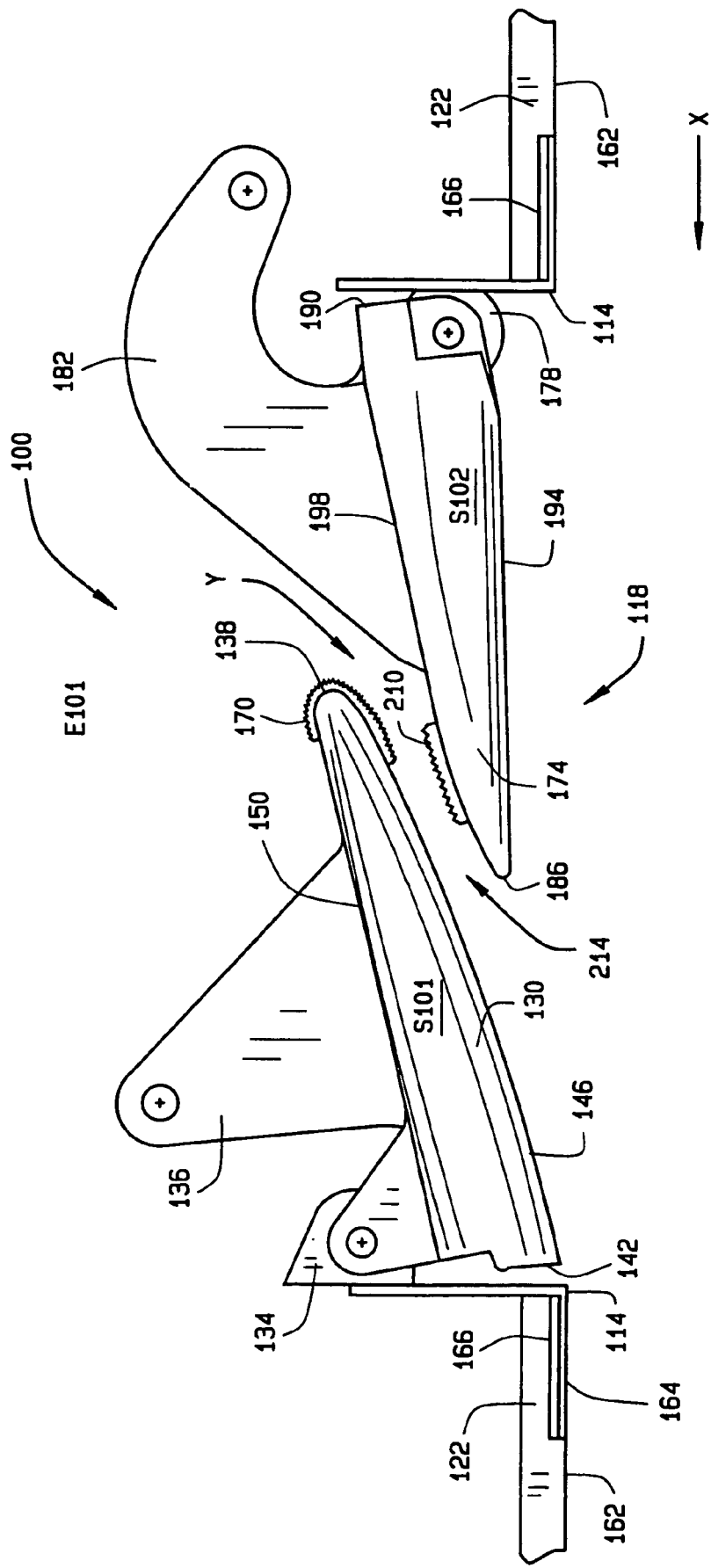
FIG. 6 is a schematic of a top view of the valve shown in FIG. 5.

FIGS. 5 and 6 are, respectively, schematics of a front view and a top view of a dual gate valve 100 for controlling the flow of a fluid, for example air, between a first environment E101 and a second environment E1 02, in accordance with another preferred embodiment of the present invention. Valve 100 includes a frame 114 adapted to fit within the perimeter of an aperture 118 in a divider 122. Frame 114 is coupled to divider 122 using fastening means 126. Valve 100 includes a first gate 130 that is substantially identical to gate 30 shown and described above in reference to FIGS. 1 and 2. For convenience and simplicity, the reference numerals used to describe valve 100 herein are the reference numerals used to describe valve 10 incremented by 100. Thus, first gate 130 includes a hinge 134, an actuator 136, a leading edge 138, a trailing edge 142, a front side 146, a backside 150, a top edge 154 and a bottom edge 158. Additionally, first gate 130 includes a general surface S101 that cumulatively includes the surfaces of leading edge 138, trailing edge 142, front side 146, backside 150, top edge 154 and bottom edge 158.

Furthermore, first gate 130 has a plurality of preferred embodiments wherein the description of the features and functions in each embodiment of gate 30 above is applicable to describe the features and functions of an embodiment of first gate 130. Further yet, FIG. 6 shows that in one preferred embodiment first gate 130 includes at least one rough texture portion 170 that is substantially identical in structure and function to the at least one rough texture portion 70 included in a preferred embodiment of gate 30. Still further, in a preferred embodiment, valve 100 includes a gasket 166 substantially identical in structure and function as gasket 66 described above in reference to FIGS. 1 and 2.

In addition to first gate 130, valve 100 includes a second gate 174 hingedly coupled to frame 114, via at least one hinge 178, such that second gate 174 is movable between an open position and a closed position within frame 114. In the closed position, using hinge 178 as a zero point of reference, second gate 174 will have approximately a one hundred and eighty degree (180°) angle with respect to divider 122. In the open position, second gate 174 can have an angle of any value between approximately one hundred and eighty degrees (180°) and zero degrees (0°), with respect to divider 122, based on a desirable fluid mass flow through aperture 118. Valve 100 can be any size suitable for a specific application. For example, in applications where large fluid mass flows are desired, valve 100 will be larger than in applications where lesser fluid mass flows are desired.

A controller (not shown), coupled to a linkage (not shown) that links actuator 136 to an actuator 182 of second gate 174, moves first gate 130 and second gate 174 within frame 114. Although in the various preferred embodiments described herein, valve 100 is described as controlling a flow of fluid in the direction Y, from E101 through valve 100 to E102, it should be understood that valve 100 controls the flow of fluid between environments E101 and E102 such that the direction of fluid flow can be in either direction. That is, valve 100 is capable of controlling the fluid flow from E101 through valve 100 to E102, or the fluid flow from E102 through valve 100 to E101.

Second gate 174 includes a trailing edge 186, a leading edge 190, a front side 194, a backside 198, a top edge 202 and a bottom edge 206. Additionally, second gate 174 includes a general surface generally indicated in FIGS. 3 and 4 by the reference character S102. Surface S102 cumulatively includes the surfaces of leading edge 190, trailing edge 186, front side 194, backside 198, top edge 202 and bottom edge 206. Second gate 174 has a substantially aerodynamically clean profile, such that surface S102 is smooth and substantially free from protrusions that would impede, or disrupt, the flow of fluid over surface S102 of second gate 174 and/or through valve 100. Therefore, fluid passing over second gate 174 is allowed to generally adhere to surface S102 as the fluid flows over second gate 174, thereby reducing the occurrence of coherent vortex shedding, which creates audible tones.

In one preferred embodiment, front side 194 of second gate 174 has a 3-dimensional contour that substantially matches the contour of outer surface 162 of divider 122. Similarly, front side 146 of first gate 130 has a 3-dimensional contour that substantially matches the contour of the outer surface 162 of divider 122. This 3-dimensional contour relation enables a boundary layer of fluid flowing across outer surface 162 to smoothly transition across valve 100. The smooth transition of the boundary layer substantially reduces unwanted edge tones.

In another preferred embodiment, at least one portion 210 of the second gate 174 surface S102 includes a rough texture. More specifically, at least one section of surface S102 is adapted to include a rough texture portion, herein referred to as rough texture portion 210. The at least one section has a specific location on surface S102 determined to be a location where coherent vortex shedding occurs. Rough texture portion 210 can be provided by coupling or bonding a material or substance having a rough texture to surface S102, or rough texture portion 210 can be provided by integrally forming rough texture portion 210 with surface S102 either during or subsequent to manufacture of second gate 174. In addition to having a specific location, rough texture portion 210 has a specific size, shape and roughness.

Rough texture portion 210 reduces tones generated by coherent vortex shedding by breaking up the vortex shedding, such that when the fluid separates from surface S and begins to tumble, the tumbling fluid will not establish a constant tumbling frequency. Thus, rough texture portion 210 effectively detunes the tones by preventing the vortex shedding from establishing a constant frequency.

To determine the location of rough texture portion 210, testing must be performed on valve 100. For example, CFD testing can be performed to determine at least one specific location on surface S102 where vortex shedding will occur. If such testing determines that vortex shedding will occur at more than one location on surface S102, then surface S102 will include a rough texture portion 210 at each location. Therefore, surface S102 can include a plurality of rough texture portions 210, one rough texture portion 210 located at each of the locations on surface S102 at which it has been determined vortex shedding will occur.

The size, shape and roughness of rough texture portion 210 that most effectively reduces, or eliminates, coherent vortex shedding at each specific location is also predetermined by testing, for example CFD testing. The size of rough texture portion 210 relates to the amount of surface area of surface S102 over which it has been determined that vortex shedding will occur. Likewise, the shape of rough texture portion 210 relates to the shape of surface area of surface S102 over which it has been determined that vortex shedding will occur.

In one preferred embodiment, the shape(s) and size(s) of the portion(s) of surface S102 over which it has been determined that vortex shedding will occur, are only used as minimum measurements to define the shape and size of rough texture portion 210. For example, it may be determined that vortex shedding will occur over a 2 cm$^2$ (0.310 in$^2$) area of surface S102 on front side 194 having a generally oval shape. Although only an oval area of 2 cm$^2$ has been determined to cause vortex shedding, for convenience and/or efficiency, surface S102 may include a rough texture portion 210 having a 3 cm$^2$ (0.465 in$^2$) generally rectangular area that covers and extends past the oval 2 cm$^2$ area. As a further example, although testing may determine that vortex shedding will occur over a small portion of surface S102 on the backside 198 of second gate 174, surface S102 may include rough texture portion 210 that covers a large portion of backside 198, all of trailing edge 186, and a portion of front side 194.

In an alternative embodiment, the size(s) and shape(s) of the portion(s) of surface S102 over which testing has determined vortex shedding will occur, are used as substantially exact measurements that define the shape and size of rough texture portion 210. For example, if testing determines that vortex shedding will occur over a 2 cm$^2$ (0.310 in$^2$) area of surface S102 on front side 194 having a generally oval shape, front side 194 will include a rough texture portion 210 covering substantially 2 cm$^2$ (0.310 in$^2$) and having a generally oval shape. In another preferred embodiment, surface S102 includes rough texture portion 210, such that substantially all of surface S102 has a rough texture.

The roughness of rough texture portion 210 is also predetermined from test results. The rough texture portion 210 has a predetermined roughness such that the texture has a "graininess", "unevenness" and/or "coarseness" that will reduce coherent vortex shedding to a desirable level, preferably substantially eliminate coherent vortex shedding.

In another preferred embodiment, the gate controller and linkage operate to move first and second gates 130 and 174 within frame 114 such that a nearly constant, or slightly convergent, nozzle throat section 214 is maintained during the most common operating angles of gate 100. More specifically, during the most common operating opening angles of gate 100, for example between 5° and 25°, first gate 130 front side 146 and second gate 174 backside 198 are maintained in an approximately parallel or slightly convergent relationship. By "slightly convergent", it is meant that backside 198 is closer to front side 146 at the trailing edge 186 of second gate 174 than at the leading edge 138 of first gate 130. The constant nozzle throat section reduces occurrence of tones created as the fluid flows between the first environment E101 and the second environment E1 02.

Figure 7:
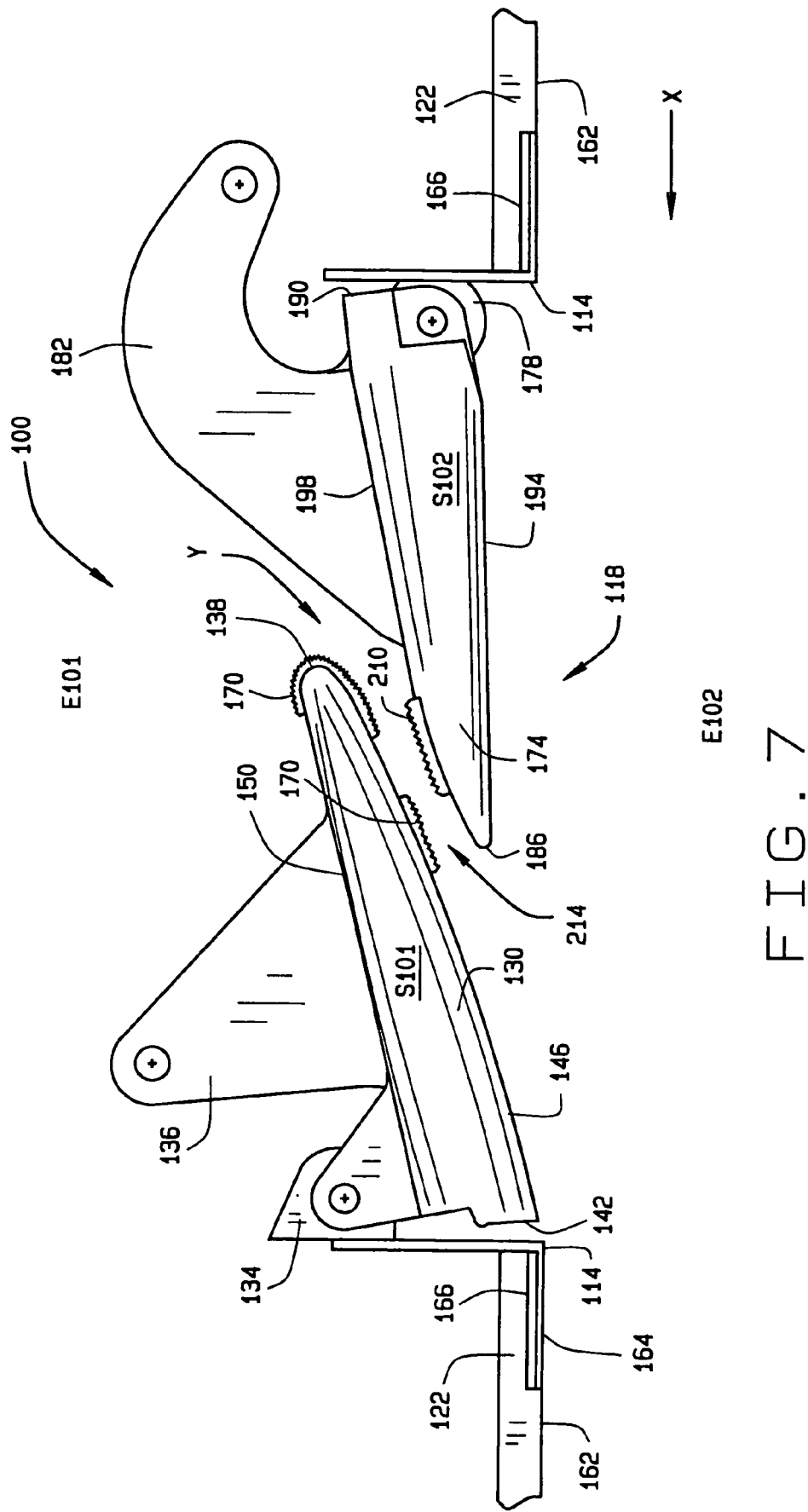
FIG. 7 is a schematic of an alternate embodiment of the valve shown in FIG. 6, wherein a first gate includes two rough texture portions and a second gate includes one texture portion.

FIG. 7 is a schematic of an alternate embodiment of valve 100, shown in FIG. 6, wherein first gate 130 includes two rough texture portions 170 and second gate 174 includes one texture portion 210. In this embodiment first gate 130 includes two rough texture portions 170 strategically located on surface S101 and having a specific size, shape and coarseness effective to substantially reduce, or eliminate, coherent vortex shedding of fluid flowing over surface S101 of first gate 130. Additionally, second gate 174 includes one rough texture portion 210 strategically located on surface S102 and having a specific size, shape and coarseness effective to substantially reduce, or eliminate, coherent vortex shedding of fluid flowing over surface S102 of second gate 174.

Depending on the opening angles of first and second gates 130 and 174 and the fluid mass flow rate through aperture 118, coherent vortex shedding can occur at leading edge 138 and front side 146 of first gate 130, and backside 198 of second gate 174. In order to substantially reduce, or eliminate, coherent vortex shedding in gate 100, rough texture portions 170 are included on surfaces S101 and S102 at these three areas. Locating rough texture portions 170 at these three locations will substantially reduce, or eliminate, the potential for noise generated by coherent vortex shedding in valve 100, regardless of the opening angles of first and second gates 130 and 174.

Figure 8:
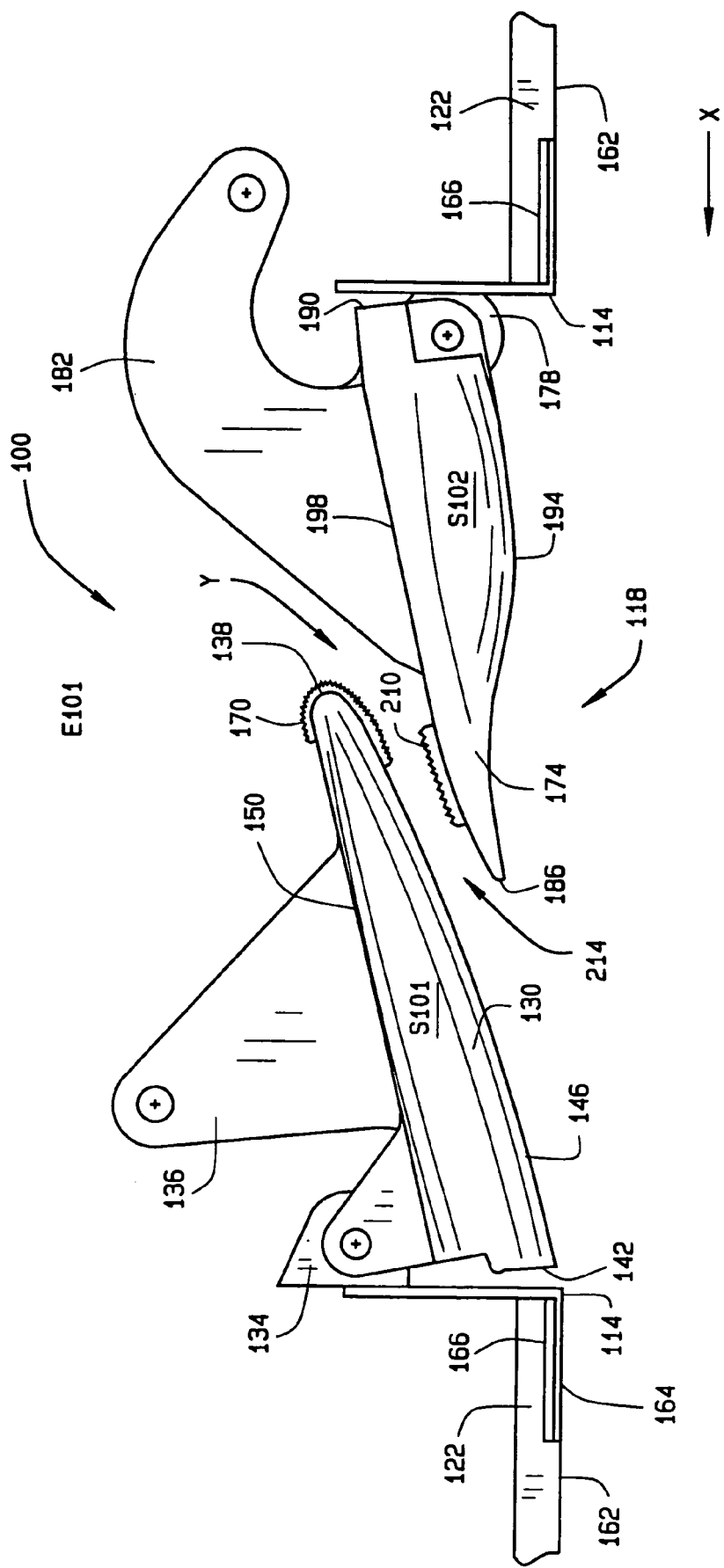
FIG. 8 is a schematic illustrating another preferred alternate embodiment of the valve shown in FIG. 6.

FIG. 8 illustrates another alternate preferred embodiment of valve 100, shown in FIG. 6. To aid in reducing vortex shedding, front side 194 has a general 'S' contour adapted to increase the adherence of fluid flowing over front side 194. More specifically, the general 'S' shape of front side 194 reduces separation from front side 194 of fluid flowing along front side 194, thereby reducing the occurrence of coherent vortex shedding. In a preferred embodiment the front side 146 of the first gate 130 has a slightly convex contour, as described above in reference to FIGS. 1 and 2. The slightly convex contour of front side 146 and the general 'S' contour of front side 194 generally reduce a velocity difference between fluid flowing through throat section 214 in the direction Y and fluid flowing along front side 194 of the second gate 174 and along divider outer surface 162 in the direction X.

Figure 9:
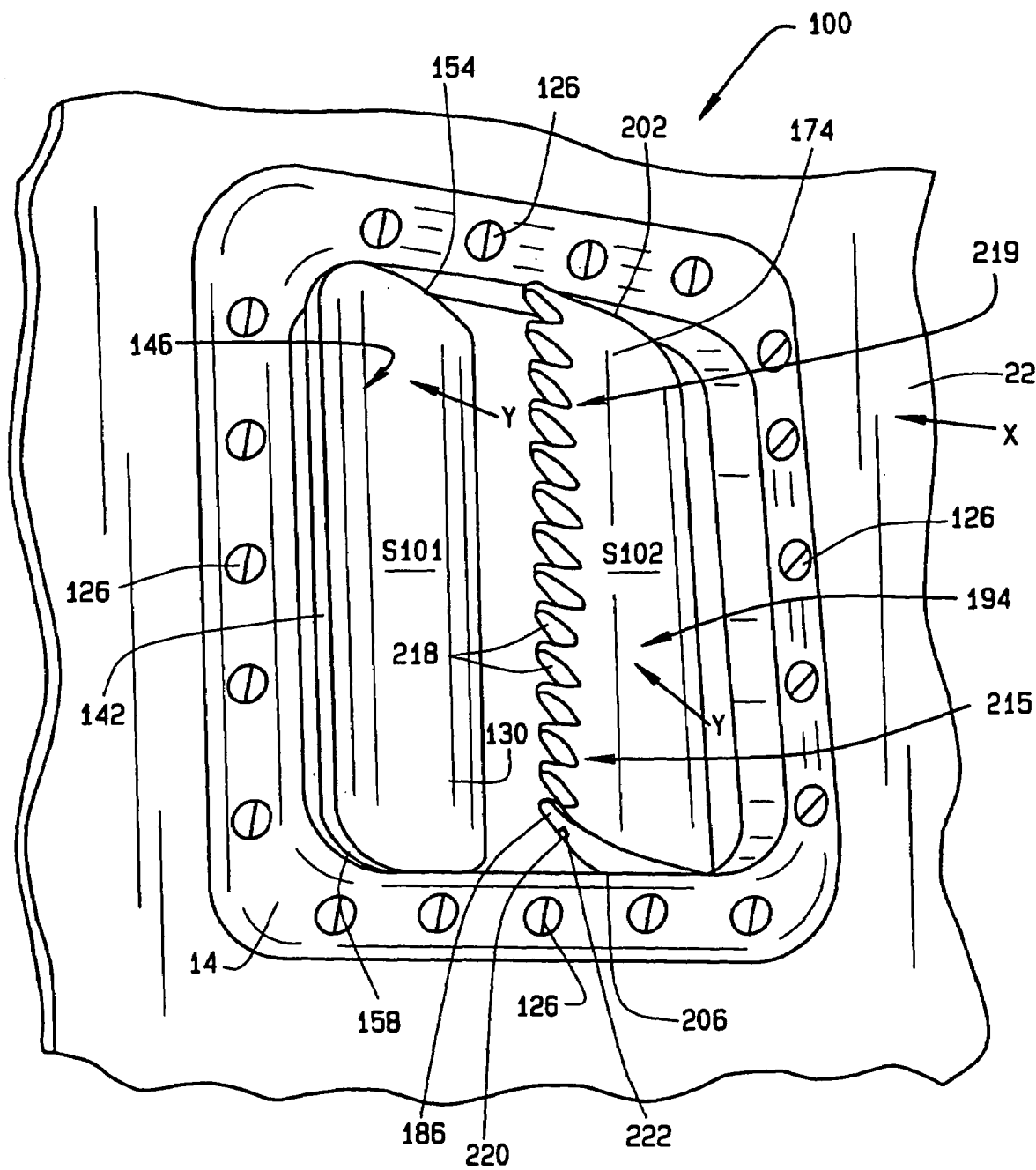
FIG. 9 is a schematic illustrating an alternate preferred embodiment of the valve shown FIG. 8.

FIG. 9 illustrates an alternate preferred embodiment of valve 100, shown in FIG. 8. To further reduce vortex shedding, trailing edge 186 of second gate 174 has a 3-dimensional (3-D) non-uniform profile. More specifically, trailing edge 186 includes 3-D notches 218. In one preferred embodiment, the notches 218 have varying lengths along the length of the trailing edge 186. For example, the notches 218 near the top and bottom edges 202 and 206 of the second gate 174 are shorter than the notches 218 near the center of the trailing edge 186. Notches 218 break up periodic structures that cause vortex shedding and substantially reduce the periodic formation of pressure variation that can also cause noise generation. The notches 218 cause fluid flowing in the direction Y along surface S102 to separate from surface S102 and begin to tumble such that the tumbling fluid will not establish a constant tumbling frequency. Furthermore, the notches 218 cause an intense mixing of the fluid flowing in the direction Y with the fluid flowing along the divider outer surface 162 in the direction X, thereby breaking up periodic flow separation of fluid structures. Generally, the notches 218 break up the periodic and symmetrical fluid flow through and across the valve 100, thereby preventing fluid resonances along the surface S102 of the second gate 174.

In another preferred embodiment, the front side of each of the notches 218 has a generally U-shaped, tapered run-out 219. Each tapered run-out begins at a vertex of each notch 218 and obliquely runs out to the trailing edge 186, similar to the notches 60 shown in FIG. 4. The generally U-shaped, tapered run-outs 219 of notches 218 are more clearly illustrated in FIG. 11 described below. Thus, surface S102 of front side 194 includes generally U-shaped chamfered indentations, i.e. run-outs 219, that begin at the vertex of each notch 218 and terminate at trailing edge 186. Therefore, a 3-D scallop-like groove is formed in the surface S102 of front side 194 at each notch 218. In yet another preferred embodiment, the run-outs 219 have a middle portion with lateral edges extending the length of the run-out 219, similar to the middle portions 61a shown in FIG. 4.

Although FIG. 9 illustrates notches 218 having a 3-D V-shape from the vertex to the trailing edge 186, notches 218 can have any shape suitable to reduce vortex shedding created as fluid flows over front side 194. For example, from the vertex to the trailing edge 186, notches 218 can have a 3-D semi-circular-shape, a 3-D square-shape or a 3-D rectangular-shape. Similarly, a particular width and depth of each notch 218 can vary depending on the effectiveness of reducing edge tones for a particular application. The width and depth of each notch 218 that will provide the best reduction of edge tones can be determined by testing on valve 100. For example CFD testing can be performed to determine the desired width and depth of each notch 218.

Figure 10:
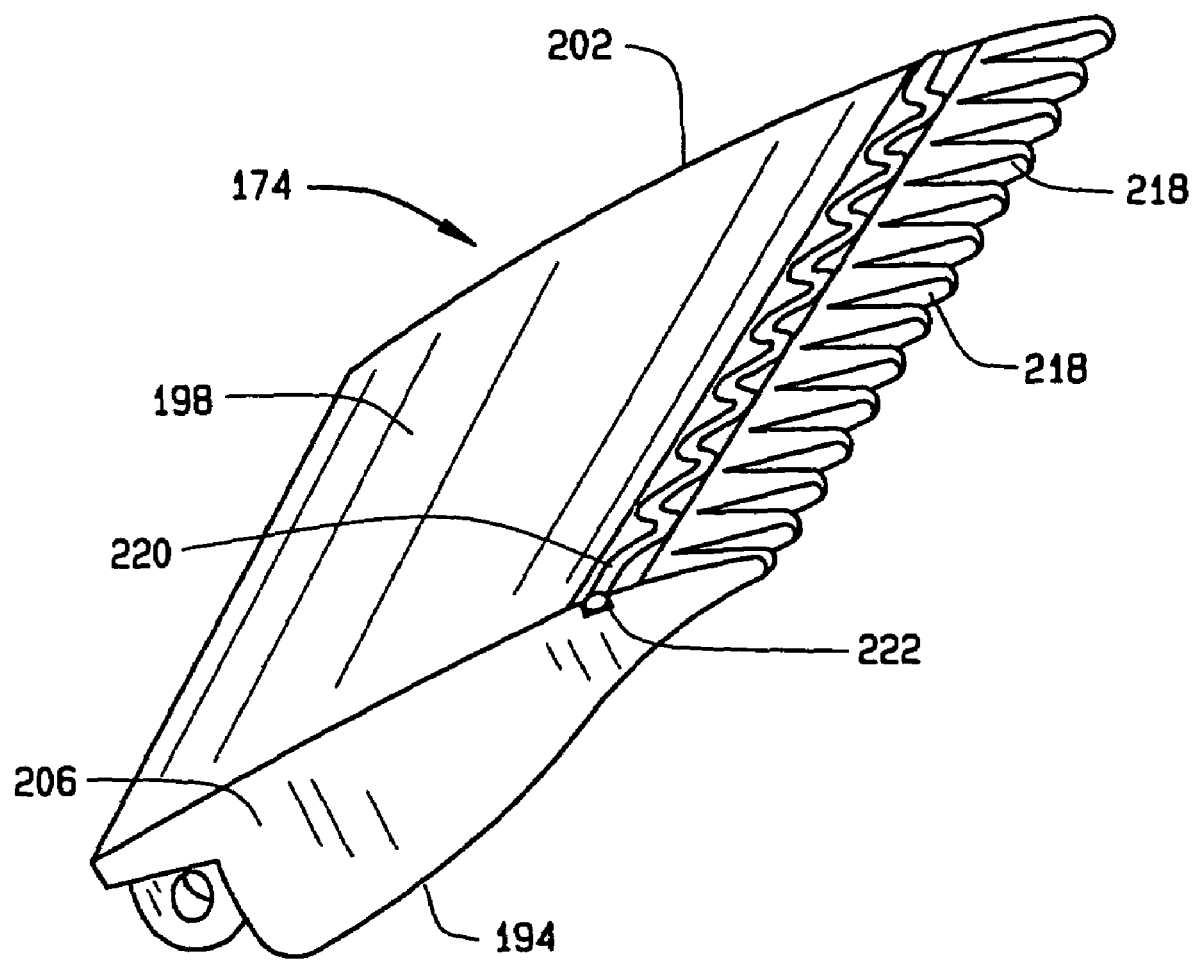
FIG. 10 is a schematic illustrating a back side of a second gate included in the valve shown in FIG. 8.

Additionally, although FIG. 9 shows notches 218 spaced apart, such that trailing edge 186 includes linear portions between each consecutive notch 218, notches 218 can be continuous along trailing edge 186. The desired length of the linear edge, or lack thereof, between each notch 218 can also be determined through testing such as CFD. In a preferred embodiment, as illustrated in FIG. 10, the back side 198 along the notches 218 substantially contours in accordance with the contour of the back side 198 of the second gate 174. Thus, the back side of each notch 218 is absent tapered run-outs. More specifically, the tapered shape of the run-out 219 in each notch 218 originates at the front side 194 of the second gate 174 and terminates approximately at or near the back side 198 of the second gate 174.

Referring now to FIGS. 9 and 10, in another preferred embodiment, the back side 198 of the second gate 174 includes a seal 220 near the trailing edge 18. The seal 220 extends across the back side 198 from the top edge 202 to the bottom edge 206 of the second gate 174. In one preferred embodiment, the seal 220 extends across the back side 198 in an undulating, or generally 'sine wave', pattern. Alternatively, the seal 220 can extend across the back side 198 in any suitable pattern, for example in a straight line or in a generally 'saw-tooth' pattern. The seal 220 is inserted in a groove 222 provided in the back side 198 of the second gate 174. The profile of seal 220 rises slightly above the surface Si 02 of the back side 198 such that when the valve 100 is in a closed state, the seal 220 seals any gap between the back side 198 of the second gate 174 and the front side 146 of the first gate 130. Sealing the gap when the valve 100 is in the closed state reduces or substantially eliminates leak tones generated by fluid flowing between the first and second gates 130 and 174.

Additionally, since the profile of the seal 220 rises slightly above the surface S102 of the back side 198, the seal 220 creates a swirling effect that causes the boundary layer flow to separate upstream from the nozzle throat section 214. The swirling effect created by the seal 220 smoothly merges the boundary layer fluid flow attached to front side 194 of the second gate 174 with the fluid flowing in the direction Y out of nozzle throat section 214 when the valve 100 is in an open state. Additionally, the 3-D non-uniform profile of trailing edge 186 breaks up eddie waves of the separated boundary layer flow. Thus, the boundary layer and fluid flowing out of nozzle throat section 214 merge smoothly, which enables fluid to exit valve 100 more efficiently.

Figure 11:
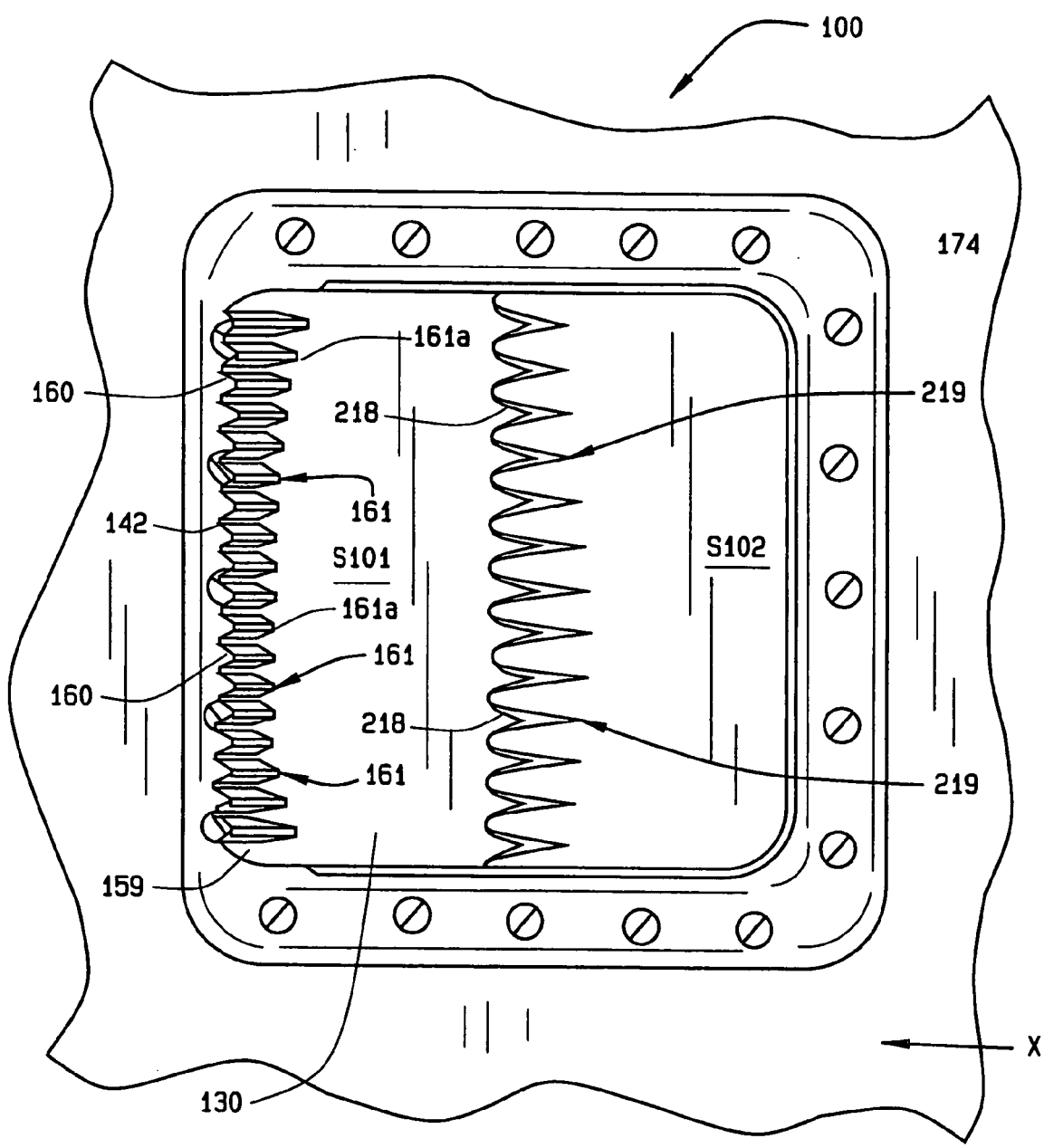
FIG. 11 is a schematic illustrating an alternate preferred embodiment of the valve shown in FIG. 9.
Figure 12:
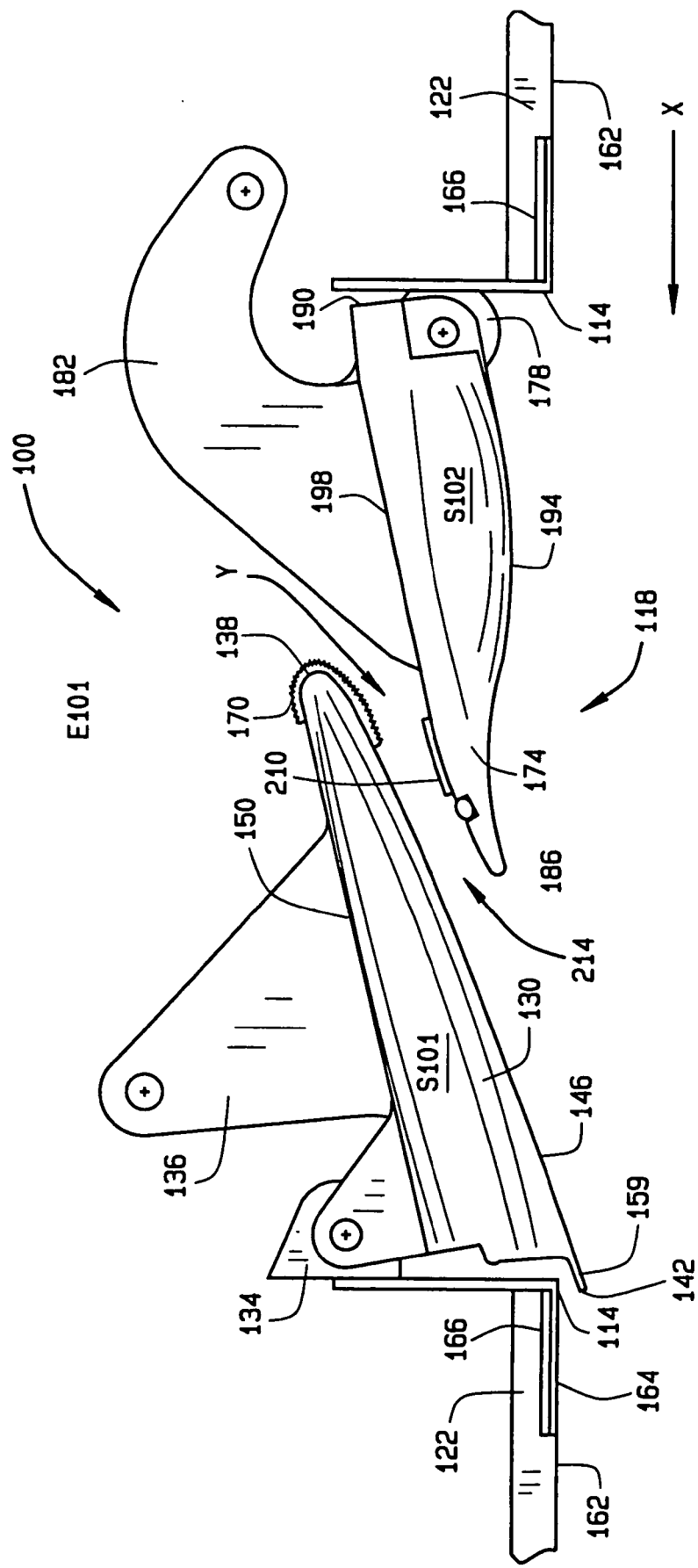
FIG. 12 is a schematic illustrating a cross-sectional of the valve shown in FIG. 11.

Referring now to FIGS. 11 and 12, another preferred embodiment of the valve 100 shown in FIGS. 8 and 9 is illustrated. In this embodiment the front side of trailing edge 186 of second gate 174 includes the 3-dimensional notches 218, as described above in reference to FIGS. 9 and 10.

Additionally, the first gate 130 includes a baffle 159 that is substantially identical in structure and function to the baffle 59 described above in reference to FIGS. 3 and 4. To further reduce vortex shedding, trailing edge 142 of baffle 159 has a 3-dimensional (3D) non-uniform profile. That is, the front side of 146 baffle 159 includes a plurality of 3-D notches 160 that are substantially identical in structure and function to the notches 60 in gate 30 described above in reference to FIG. 4.

Notches 160 and 218 break up periodic flow structures that cause vortex shedding and substantially reduce the periodic formation of pressure variations that can also cause noise generation. The notches 160 cause fluid flowing in the direction Y along surface S101 to separate from surface S101 and begin to tumble such that the tumbling fluid will not establish a constant tumbling frequency. Furthermore, the notches 160, of the first gate 130, cause an intense mixing of the fluid flowing in the direction Y with the fluid flowing along the divider outer surface 162 in the direction X, thereby breaking up periodic flow separation of fluid structures. Generally, the notches 160 break up the periodic and symmetrical fluid flow through and across the valve 100, thereby preventing fluid resonances along the surface S101 of the first gate 130.

In one preferred embodiment, the front side of each of the notches 160 has a generally U-shaped, tapered run-out 161 that begins at a vertex of the respective notch 160 and obliquely runs out to the trailing edge 142 of the baffle 159. Thus, surface S101 of front side 146 includes chamfered indentations, i.e. run-outs 161, that begin at the vertex of each notch 160 and terminate at trailing edge 142. Therefore, a 3-D scallop-like groove is formed in the surface S101 of front side 146 at each notch 160. In one preferred embodiment, each of the run-outs 161 have a middle portion 161a with lateral edges extending the length of the run-out 161. The run-outs 161 can have equal lengths, or various run-outs 161 can have differing lengths, depending on the desired design specification.

Although FIG. 11 illustrates notches 160 having a 3-D V-shape, from the vertex to the trailing edge 142, notches 160 can have any shape suitable to reduce tones created as fluid passes over trailing edge 142. For example, from the vertex to the trailing edge 142, notches 160 can have a 3-D semi-circular-shape, a 3-D square-shape or a 3-D rectangular-shape. Similarly, a particular width and depth of each notch 160 can vary depending on the effectiveness of reducing edge tones for a particular application. The width and depth of each notch 160 that will provide the best reduction of edge tones can be determined by testing on valve 100. For example, CFD testing can be performed to determine the desired width and depth of each notch 160.

Additionally, although notches 160 are shown in FIG. 11 to be spaced apart, such that trailing edge 142 includes linear portions between each consecutive notch 160, notches 160 can be continuous along trailing edge 142,. The desired length of the linear edge, or lack thereof, between each notch 160 can also be determined through testing, such as CFD. In a preferred embodiment, the back side of the baffle 159 is substantially flat. Thus, the back side of each notch 160 is absent tapered run-outs. More specifically, the tapered shape of the run-out 161 in each notch 160 originates at the front side 146 of the first gate 130 and terminates approximately at or near the back side 150 of the first gate 130.

To aid in reducing vortex shedding, front side 194 of the second gate 174 has a general 'S' contour, as described above in reference to FIG. 8. The general 'S' shape of front side 194 reduces separation from front side 194 of fluid flowing along front side 194, thereby reducing the occurrence of coherent vortex shedding. Additionally, in a preferred embodiment the front side 146 of the first gate 130 has a slightly convex contour, as described above in reference to FIGS. 1 and 2. The slightly convex contour of front side 146 and the general 'S' contour of front side 194 generally reduce a velocity difference between fluid flowing through valve 100 in the direction Y and fluid flowing along the front side 194 of the second gate 174 and along the divider outer surface 162 in the direction X. Furthermore, the reduction in velocity difference combined with the intense mixing of the fluid caused by the notches 218 in the second gate 174 generally precludes the formation of periodic alternating transverse flow separation structures.

In a preferred embodiment, as illustrated in FIG. 12, first gate 130 includes at least one rough texture portion 170 as described above in reference to FIGS. 6, 7 and 8. Additionally, second gate 174 includes at least one rough texture portion 210 as described above in further reference to FIGS. 6,7 and 8.

Although the rough texture portions 70, 170 and 210 are illustrated throughout the FIGS. 2, 3, 6, 7, 8 and 12 as having a thickness that creates a non-flush relationship with the respective surfaces S, S101 and S102, the thickness of the rough texture portions 70, 170 and 210 is shown for clarity in illustration only. It will be appreciated that in application the rough texture portions 70, 170 and 210 are substantially flush with the respective surfaces S, S101 and S102 such that the surfaces S, S101 and S102 are substantially aerodynamically clean, as described above.

In an exemplary embodiment, valve 100 can be an outflow valve for controlling air pressure within a mobile platform passenger cabin. In this exemplary embodiment, first gate 130 would be an aft gate, second gate 174 would be a forward gate and valve 100 would be installed in an aperture in an outer skin of a fuselage or body of the mobile platform and would control the flow of air, in the direction Y, from inside the mobile platform to an ambient environment outside the mobile platform. The features of the various preferred embodiments described above would substantially reduce, or eliminate, noise audible in the passenger cabin, from being generated by air flowing out of the outflow valve and by air flowing across the outflow valve external to the aircraft.

While the invention has been described in terms of various specific embodiments, those skilled in the art will recognize that the invention can be practiced with modification within the spirit and scope of the claims.

What is claimed is:

1. A valve for controlling a flow of a fluid between a first environment to a second environment, said valve comprising:

a frame adapted to fit within a perimeter of an aperture in a divider separating the first environment from the second environment;

an aft gate movable within the frame to control a flow of the fluid through the aperture between the first environment and the second environment, the aft gate comprising:

a trailing edge comprising a baffle extending past an aft edge of the frame and covering a portion of an exterior face of the frame when the aft gate is in an open position, the baffle including a plurality of 3-D notches in a front side of the baffle; and a forward gate movable within the frame to control a flow of the fluid through the aperture between the first environment and the second environment, the forward gate comprising:

a trailing edge comprising a plurality of 3-D notches in a front side of the trailing edge.

2. The valve of claim 1, wherein the aft gate further comprises:

a substantially aerodynamically clean surface substantially free from protrusions that cause the generation of noise as the fluid flows over the aft gate surface; and a rounded leading edge.

3. The valve of claim 1, wherein the forward gate further comprises a substantially aerodynamically clean surface substantially free from protrusions that cause the generation of noise as the fluid flows over the forward gate surface.

4. The valve of claim 1, wherein each notch included in the baffle comprises a tapered run-out that begins at a vertex of each notch and obliquely runs out to the trailing edge.

5. The valve of claim 1, wherein the aft gate has an outer side having a substantially convex shape adapted to reduce vortex shedding of the fluid as the fluid passes over the outer side of the aft gate.

6. The valve of claim 1, wherein the valve is adapted to maintain a substantially constant or slightly convergent nozzle throat section between the aft gate and the forward gate, thereby reducing at least one of edge tones and throat tones created as the fluid flows between the first environment and the second environment.

7. The valve of claim 1, wherein a front side of the forward gate has a general 'S' contour adapted to increase adherence to the forward gate front side of the fluid flowing over the front side.

8. The valve of claim 1, wherein each notch included in the trailing edge of the forward gate includes a tapered run-out that begins at a vertex of each notch and obliquely runs out to the trailing edge.

9. The valve of claim 1, wherein a back side of the forward gate includes a seal adapted to reduce leak tones when the valve is in a closed state.

10. The valve of claim 9, wherein the seal extends across the back side in an undulating pattern adapted to create a swirling effect when the valve is in an open position that causes a boundary layer of fluid flow attached to the back side of the forward gate to separate upstream from a nozzle throat section of the valve.

11. The valve of claim 1, wherein a front side of the aft gate and a front side of the forward gate both have a 3-D contour that substantially matches a contour of an outer surface of the divider.

12. A method for reducing noise generated by a flow of a fluid through a control valve from a first environment to a second environment, the method comprising:

providing a valve to be installed in a divider separating the first environment and the second environment, the valve having a frame, an aft gate movable within the frame and a forward gate movable within the frame, the aft and forward gates adapted to control the flow of fluid from the first environment to the second environment, reducing edge tones as the fluid flows through the valve by providing a baffle included in a trailing edge of the aft gate that extends past an aft edge of the frame and covers a portion of an exterior face of the frame when the aft gate is in an open position;

reducing vortex shedding by providing a plurality of 3-D notches in a front side of the baffle; and reducing vortex shedding by providing a plurality of 3-D notches in a front side of a trailing edge of the forward gate.

13. The method of claim 12, wherein the method further comprises reducing vortex shedding by providing the aft gate with a rounded leading edge and a substantially aerodynamically clean surface substantially free from protrusions that cause the generation of noise as the fluid flows over the aft gate surface.

14. The method of claim 12, wherein the method further comprises reducing vortex shedding by providing the forward gate with a substantially aerodynamically clean surface substantially free from protrusions that cause the generation of noise as the fluid flows over the forward gate surface.

15. The method of claim 12, wherein providing the plurality of notches in the front side of the baffle comprises providing a tapered run-out within each notch that begins at a vertex of each notch and obliquely runs out to the trailing edge.

16. The method of claim 12, wherein the method further comprises reducing vortex shedding by providing the aft gate with an outer side having a substantially convex shape.

17. The method of claim 12, wherein the method further comprises reducing vortex shedding by aligning the aft and forward gates within the frame such that a substantially constant or slightly convergent nozzle throat section is maintained between the aft gate the forward gate during operation of the valve.

18. The method of claim 12, wherein the method further includes reducing vortex shedding by increasing adherence to the front side of the forward gate of the fluid flowing over the front side by contouring an outer side of the forward gate in a general 'S' shape.

19. The method of claim 12, wherein providing the plurality of notches in a front side of a trailing edge of the forward gate comprises providing a tapered run-out within each notch that begins at a vertex of each notch and obliquely runs out to the trailing edge.

20. The method of claim 12, wherein the method further includes reducing leak tones when the valve is in a closed position by providing a seal in a back side of the forward gate.

21. The method of claim 20, wherein the method further comprises extending the seal across the back side in an undulating pattern that creates a swirling effect that causes a boundary layer flow to separate from the back side of the forward gate upstream from a nozzle throat section of the valve.

22. A mobile platform comprising:

a body comprising an outer shell having an aperture therethrough, and a valve adapted to fit within the aperture for controlling the flow of air between an environment inside the mobile platform and an environment outside of the mobile platform, wherein said valve comprises:

a frame adapted to fit within a perimeter of the aperture;

an aft gate movable within the frame to control a flow of the fluid through the aperture between the first environment and the second environment, the aft gate comprising a trailing edge comprising a baffle extending past an aft edge of the frame and covering a portion of an exterior face of the frame when the aft gate is positioned to have a small opening angle, wherein a front side of the baffle includes a plurality of 3-D notches having a tapered run-out that begins at a vertex of each notch and obliquely runs out to the trailing edge; and a forward gate movable within the frame to control a flow of the fluid through the aperture between the first environment and the second environment, the forward gate comprising a trailing edge including a front side comprising a plurality of 3-D notches having a tapered run-out that begins at a vertex of each notch and obliquely runs out to the trailing edge.

23. The mobile platform of claim 22, wherein the aft gate further comprises a rounded leading edge and a substantially aerodynamically clean surface substantially free from protrusions that cause the generation of noise as the fluid flows over the aft gate surface.

24. The mobile platform of claim 22, wherein the forward gate further comprises a substantially aerodynamically clean surface substantially free from protrusions that cause the generation of noise as the fluid flows over the forward gate surface.

25. The mobile platform of claim 22, wherein the valve is adapted to maintain a substantially constant or slightly convergent nozzle throat section between the aft gate and the forward gate, thereby reducing at least one of edge tones and throat tones created as the fluid flows between the first environment and the second environment.

26. The mobile platform of claim 22, wherein a back side of the forward gate includes the seal extending across the back side in an undulating pattern to create a swirling effect when the valve is in an open position that causes a boundary layer of fluid flow attached to the back side of the forward gate to separate upstream from a nozzle throat section of the valve.

* * * * *